US012585153B2

(12) United States Patent
    Tokyo et al.

(10) Patent No.: US 12,585,153 B2
(45) Date of Patent: Mar. 24, 2026

(54) DISPLAY DEVICE, ELECTRONIC APPARATUS, AND METHOD FOR MANUFACTURING DISPLAY DEVICE

(71) Applicant: Lenovo (Singapore) Pte. Ltd., Singapore (SG)

(72) Inventors: Asahi Tokyo, Kanagawa (JP); Kiyoshi Nakagawa, Kanagawa (JP); Junki Sato, Kanagawa (JP); Masato Sugiyama, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/903,221

(22) Filed: Oct. 1, 2024

(65) Prior Publication Data

US 2025/0123515 A1    Apr. 17, 2025

(30) Foreign Application Priority Data

Oct. 12, 2023    (JP) ................................. 2023-176387

(51) Int. Cl.
    *G02F 1/1335* (2006.01)
    *G02F 1/1333* (2006.01)
    *G02F 1/1343* (2006.01)

(52) U.S. Cl.
    CPC .... *G02F 1/133531* (2021.01); *G02F 1/13338* (2013.01); *G02F 1/134309* (2013.01)

(58) Field of Classification Search
    CPC ........... G02F 1/133531; G02F 1/13338; G02F 1/134309
    See application file for complete search history.

(56) References Cited

U.S. PATENT DOCUMENTS

| | | | |
|---|---|---|---|
| 5,995,172 A | 11/1999 | Ikeda et al. | |
| 10,209,584 B2 * | 2/2019 | Zhang .................. | H10D 86/441 |
| 2018/0046279 A1 * | 2/2018 | Weng .................. | G02F 1/13338 |

FOREIGN PATENT DOCUMENTS

| | | | |
|---|---|---|---|
| JP | 4509469 B2 * | 7/2010 | |
| JP | 2013191015 A | 9/2013 | |
| JP | 2013239138 A | 11/2013 | |
| JP | 2014235751 A | 12/2014 | |
| JP | 2016103072 A | 6/2016 | |
| JP | 2016157263 A | 9/2016 | |
| JP | 2021-125158 A | 8/2021 | |
| JP | 2022160982 A | 10/2022 | |

* cited by examiner

*Primary Examiner* — Lucy P Chien

(74) *Attorney, Agent, or Firm* — Osha Bergman Watanabe & Burton LLP

(57) ABSTRACT

A display device having a rear surface includes: a first polarizer having a first main surface; a second polarizer disposed closer to the rear surface than the first polarizer, the second polarizer to be opposed to the first main surface of the first polarizer; a liquid crystal cell between the first polarizer and the second polarizer; and a touch function layer between the first polarizer and the liquid crystal cell, the touch function layer having an electrode that detects a touch input, the touch function layer being disposed on the first main surface of the first polarizer.

5 Claims, 5 Drawing Sheets

DISPLAY DEVICE, ELECTRONIC APPARATUS, AND METHOD FOR MANUFACTURING DISPLAY DEVICE

CROSS-REFERENCE TO RELATED APPLICATIONS

This application claims priority to Japanese Patent Application No. 2023-176387 filed on Oct. 12, 2023, the contents of which are hereby incorporated herein by reference in their entirety.

TECHNICAL FIELD

The present invention relates to a display device, an electronic apparatus, and a method for manufacturing a display device.

BACKGROUND

Electronic apparatuses equipped with touch-operable display devices are available (see, for example, Japanese Unexamined Patent Application Publication No. 2022-160982). A touch-operable display device has a touch function section including electrodes for detecting a touch input.

For these electronic apparatuses, thinner display devices having a touch function have been demanded.

SUMMARY

One or more embodiments of the present invention provide a thinner display device having a touch function and such an electronic apparatus.

A display device according to one or more embodiments of the present invention has a rear surface and includes: a first polarizer having a first main surface; a second polarizer disposed closer to the rear surface than the first polarizer, the second polarizer to be opposed to the first main surface of the first polarizer; a liquid crystal cell between the first polarizer and the second polarizer; and a touch function layer between the first polarizer and the liquid crystal cell, the touch function layer having an electrode that detects a touch input, the touch function layer being disposed on the first main surface of the first polarizer.

The electrode may include: a first electrode extending in a first direction along the first main surface; and a second electrode extending in a second direction along the first main surface, the second direction intersecting the first direction, and the first electrode and the second electrode may have a multilayer structure.

An electronic apparatus according to one or more embodiments of the present invention includes the display device.

A method for manufacturing a display device according to one or more embodiments of the present invention manufactures a display device having a rear surface and including: a first polarizer having a first main surface; a second polarizer disposed closer to the rear surface than the first polarizer, the second polarizer to be opposed to the first main surface of the first polarizer; a liquid crystal cell between the first polarizer and the second polarizer; and a touch function layer between the first polarizer and the liquid crystal cell, the touch function layer having an electrode that detects a touch input, the method using a recess forming tool having a plurality of protruding portions to press the protruding portions against a surface of an insulating layer, thus forming recessed portions, and filling the recessed portions with an electrically conductive material to form the electrode, to form the touch function layer of the display device.

One or more embodiments of the present invention provide a thinner display device having a touch function and such an electronic apparatus.

DETAILED DESCRIPTION

The following describes a display device, an electronic apparatus, and a method for manufacturing a display device according to one or more embodiments of the present invention.

[Electronic Apparatus]

Figure 1:
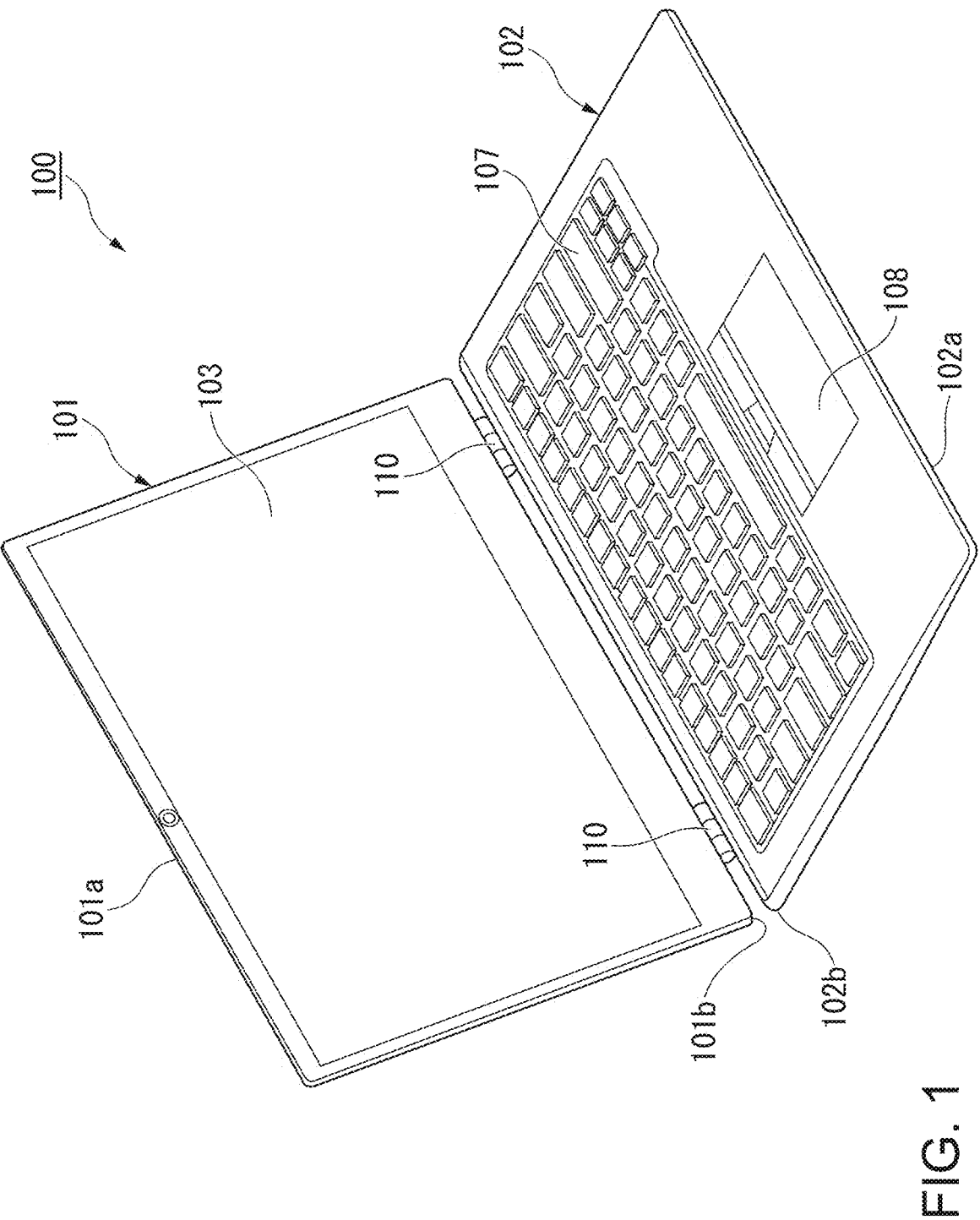
FIG. 1 is a perspective view of an electronic apparatus according to one or more embodiments.
Figures 2, 3:
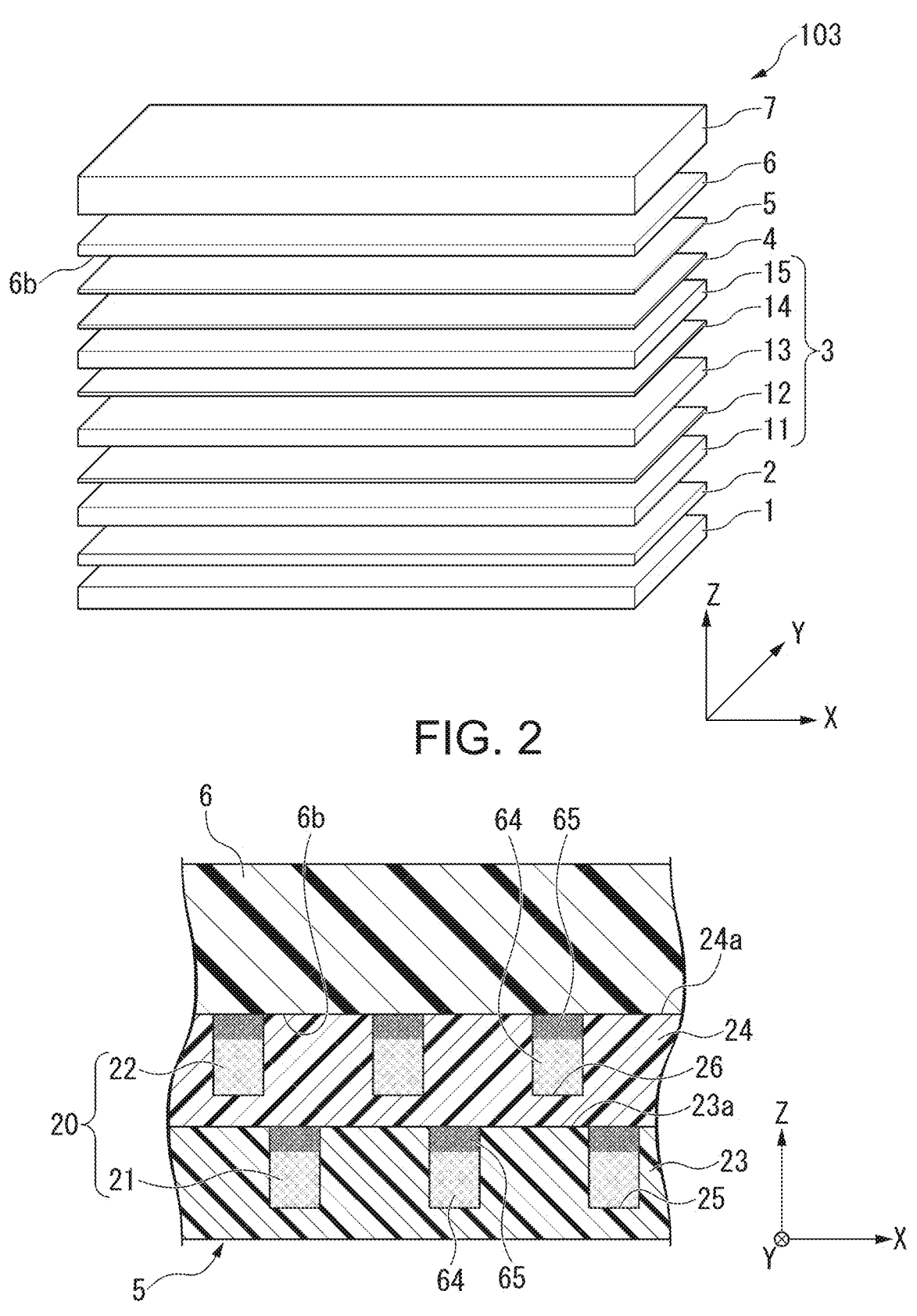
FIG. 2 is a schematic exploded perspective view of a display device according to one or more embodiments.
FIG. 3 is an enlarged cross-sectional view of a first polarizer and a touch function layer of a display device according to one or more embodiments.

FIG. 1 is a perspective view of an electronic apparatus 100 according to one or more embodiments. FIG. 2 is a schematic exploded perspective view of a display device 103. FIG. 3 is an enlarged cross-sectional view of a first polarizer 6 and a touch function layer 5.

As illustrated in FIG. 1, the electronic apparatus 100 includes a first chassis 101 and a second chassis 102 (chassis). In one example, the electronic apparatus 100 is a laptop personal computer (PC).

The first chassis 101 and second chassis 102 are connected to each other at their ends via a hinge mechanism 110. The first chassis 101 is rotatable relative to the second chassis 102 around the rotary shaft of the hinge mechanism 110.

The second chassis 102 is also called a system chassis. The second chassis 102 has a rectangular plate shape. An end of the second chassis 102 where the hinge mechanism 110 is located is called a second base end 102b. The end opposite to the second base end 102b is called a second open end 102a. The second chassis 102 has a keyboard 107 and a touchpad 108 placed thereon.

The first chassis 101 is also called a display chassis. The first chassis 101 has a rectangular plate shape. An end of the first chassis 101 where the hinge mechanism 110 is located is called a first base end 101*b*. The end opposite to the first base end 101*b* is called a first open end 101*a*.

The first chassis 101 has the display device 103 place thereon. In one example, the display device 103 is a liquid crystal display.

[Display Device]

As illustrated in FIG. 2, the display device 103 includes a backlight unit 1, a second polarizer 2, a liquid crystal cell 3, an optical bonding layer 4, a touch function layer 5, a first polarizer 6, and a cover 7.

The following describes the positional relationship of the components of the display device 103 using the XYZ orthogonal coordinate system. X direction and Y direction are parallel to the lower surface 6*b* (first main surface) of the first polarizer 6. X and Y directions are orthogonal to each other. Z direction is orthogonal to X direction and Y direction. The plane that includes X and Y directions is XY plane.

Referring to FIG. 2, the vertical positional relationship of the components is described. In FIG. 2, the cover 7 is located above the backlight unit 1. The upper surface of the display device 103 in FIG. 2 is a viewing surface. The "viewing surface" is a surface of the display device 103 that is viewed by the user. The viewing surface of the display device 103 faces the second chassis 102 when the first chassis 101 is closed to the second chassis 102. The "rear surface" is the surface opposite to the viewing surface. The positional relationship defined here does not limit the posture of the display device and electronic apparatus during use.

The backlight unit 1, second polarizer 2, liquid crystal cell 3, optical bonding layer 4, touch function layer 5, first polarizer 6, and cover 7 are stacked in this order from the rear surface toward the viewing surface.

For example, the backlight unit 1 includes a light guide plate and a light emitting element disposed on an end face of the light guide plate. The backlight unit 1 may include a light diffusion plate and a light emitting element placed on the rear surface of the light diffusion plate.

For example, a polarizing film made of resin may be used as the second polarizer 2. The second polarizer 2 has a polarizing film and a protective film (resin film) covering one or both surfaces of the polarizing film, for example. Examples of resin constituting the polarizing film include polyvinyl alcohol (PVA) resins and ethylene-vinyl acetate copolymer resins. The second polarizer 2 is opposed to the lower surface 6*b* of the first polarizer 6.

The liquid crystal cell 3 (liquid crystal panel) includes a TFT substrate 11, a TFT electrode layer 12, a liquid crystal layer 13, a color filter 14, and a color filter substrate 15. The TFT substrate 11, TFT electrode layer 12, liquid crystal layer 13, color filter 14, and color filter substrate 15 are stacked in this order from the rear surface toward the viewing surface.

The TFT substrate 11 (TFT: thin film transistor) is made of glass, resin, and other materials.

The TFT electrode layer 12 is formed on the upper surface of the TFT substrate 11. The TFT electrode layer 12 includes a plurality of TFT elements and pixel electrodes. The pixel electrodes are transparent electrodes that are light transmissive. The pixel electrodes are made of indium tin oxide (ITO), indium zinc oxide (IZO), indium oxide, tin oxide, or other materials, for example.

The liquid crystal layer 13 includes positive or negative type liquid crystal molecules, for example.

The color filter 14 includes a red color filter overlapping with red sub-pixels R, a green color filter overlapping with green sub-pixels G, and a blue color filter overlapping with blue sub-pixels B. The color filter 14 is formed on one of the surfaces of a color filter substrate 15, for example.

The color filter substrate 15 is made of glass, for example.

For example, the liquid crystal cell 3 has a transmissive display function of selectively transmitting light irradiated from the backlight unit 1, thus displaying an image. The liquid crystal cell 3 is an example of a display panel.

The optical bonding layer 4 is light transmissive. The optical bonding layer 4 may be made of optical clear adhesive (OCA) in a sheet form. The optical bonding layer 4 may be made of optical clear resin (OCR). The optical bonding layer 4 is placed between the upper surface of the liquid crystal cell 3 and the lower surface of the touch function layer 5. The optical bonding layer 4 bonds the liquid crystal cell 3 and the touch function layer 5 together. The optical bonding layer may be an optical adhesive layer.

As illustrated in FIG. 3, the touch function layer 5 includes a first insulating layer 23 in which a plurality of first electrodes 21 are formed, and a second insulating layer 24 in which a plurality of second electrodes 22 are formed. The second insulating layer 24 is formed on the first insulating layer 23. The first insulating layer 23 and the second insulating layer 24 are stacked in the thickness direction (Z direction).

The first insulating layer 23 and the second insulating layer 24 are made of resin that is an insulating material, for example. Examples of the resin that constitutes the first insulating layer 23 and the second insulating layer 24 include a UV-curable resin and a thermoplastic resin. The first insulating layer 23 and the second insulating layer 24 are examples of insulating layers (resin layers).

The touch function layer 5 includes an electrode 20 (touch detection electrode) having electrodes to detect a touch input. The electrode 20 is connected to a control board (not illustrated) via a flexible printed circuit board 71 (see FIG. 11). The control board is mounted in the first chassis 101 (see FIG. 1).

The electrode 20 includes a plurality of first electrodes 21 and a plurality of second electrodes 22. The first electrodes 21 extend in a first direction. The first direction is along the XY plane. The plurality of first electrodes 21 are spaced from each other in their width direction. The second electrodes 22 extend in a second direction. The second direction is along the XY plane. The plurality of second electrodes 22 are spaced from each other in their width direction. The second direction intersects the first direction. For instance, the second direction is orthogonal to the first direction. The first insulating layer 23 and the second insulating layer 24 are overlapped in the thickness direction (Z direction), so that the first electrodes 21 and the second electrodes 22 form a multilayer structure.

The electrode 20 may be of a mutual capacitance type. One of the first electrodes 21 and the second electrodes 22 is a transmitting electrode (drive electrode) Tx. The other of the first electrodes 21 and the second electrodes 22 is a receiving electrode (detection electrode) Rx. In the mutual capacitance type, the transmitting electrode Tx and the receiving electrode Rx generate an electric field. The electrode 20 detects a change in the electric field associated with the proximity or a contact of an object. This allows the electrode 20 to detect a touch input by a user's finger, for example.

The first insulating layer 23 has an upper surface 23*a* (one of the surfaces) with a plurality of first recessed portions 25 formed therein. The first recessed portions 25 have a groove-like shape extending along the first direction, for example. The plurality of first recessed portions 25 are spaced from each other in the groove width direction. The first electrodes 21 are made of an electrically conductive material 64, with which the first recessed portions 25 are filled.

The second insulating layer 24 has an upper surface 24*a* (one of the surfaces) with a plurality of second recessed portions 26 formed therein. The second recessed portions 26 have a groove-like shape extending along the second direction, for example. The plurality of second recessed portions 26 are spaced from each other in the groove width direction. The second electrodes 22 are made of an electrically conductive material 64, with which the second recessed portions 26 are filled.

A protective layer 65 made of black ink may be formed on the surface of the electrically conductive material 64 in each of the first recessed portions 25 and the second recessed portions 26.

Figure 12:
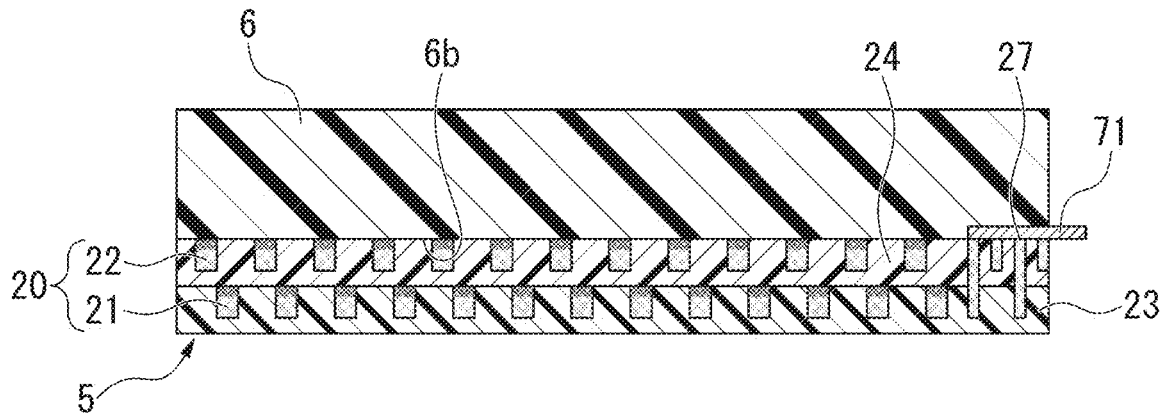
FIG. 12 illustrates a step in the method for manufacturing a display device according to one or more embodiments.

A terminal 27, which is electrically connected to the first electrodes 21 and the second electrodes 22, is formed on a part of the upper surface 24*a* of the second insulating layer 24 (see FIG. 12).

The touch function layer 5 is formed on the lower surface 6*b* (first main surface) of the first polarizer 6. The touch function layer 5 has an upper surface (the upper surface 24*a* of the second insulating layer 24) that is in direct or indirect contact with the lower surface 6*b* of the first polarizer 6. For example, the upper surface of the touch function layer 5 may be formed directly on the lower surface 6*b* (i.e., without any inclusions), or may be formed on the lower surface 6*b* via an optical bonding layer (or optical adhesive layer), for example.

As illustrated in FIG. 2, the first polarizer 6 may include a polarizing film made of resin, for example. For example, the first polarizer 6 has a polarizing film and a protective film (resin film) covering one or both surfaces of the polarizing film. Examples of resin constituting the polarizing film include polyvinyl alcohol (PVA) resins and ethylene-vinyl acetate copolymer resins. The transmission axis of the first polarizer 6 is orthogonal to the transmission axis of the second polarizer 2 when viewed from Z direction (the direction orthogonal to the lower surface 6*b*), for example. For example, the first polarizer 6 has flexibility.

The cover 7 is made of glass, resin, or other materials. The cover 7 has a plate shape.

[Method for Manufacturing a Display Device]

The following describes a method for manufacturing a display device according to one embodiment.

Figure 4:
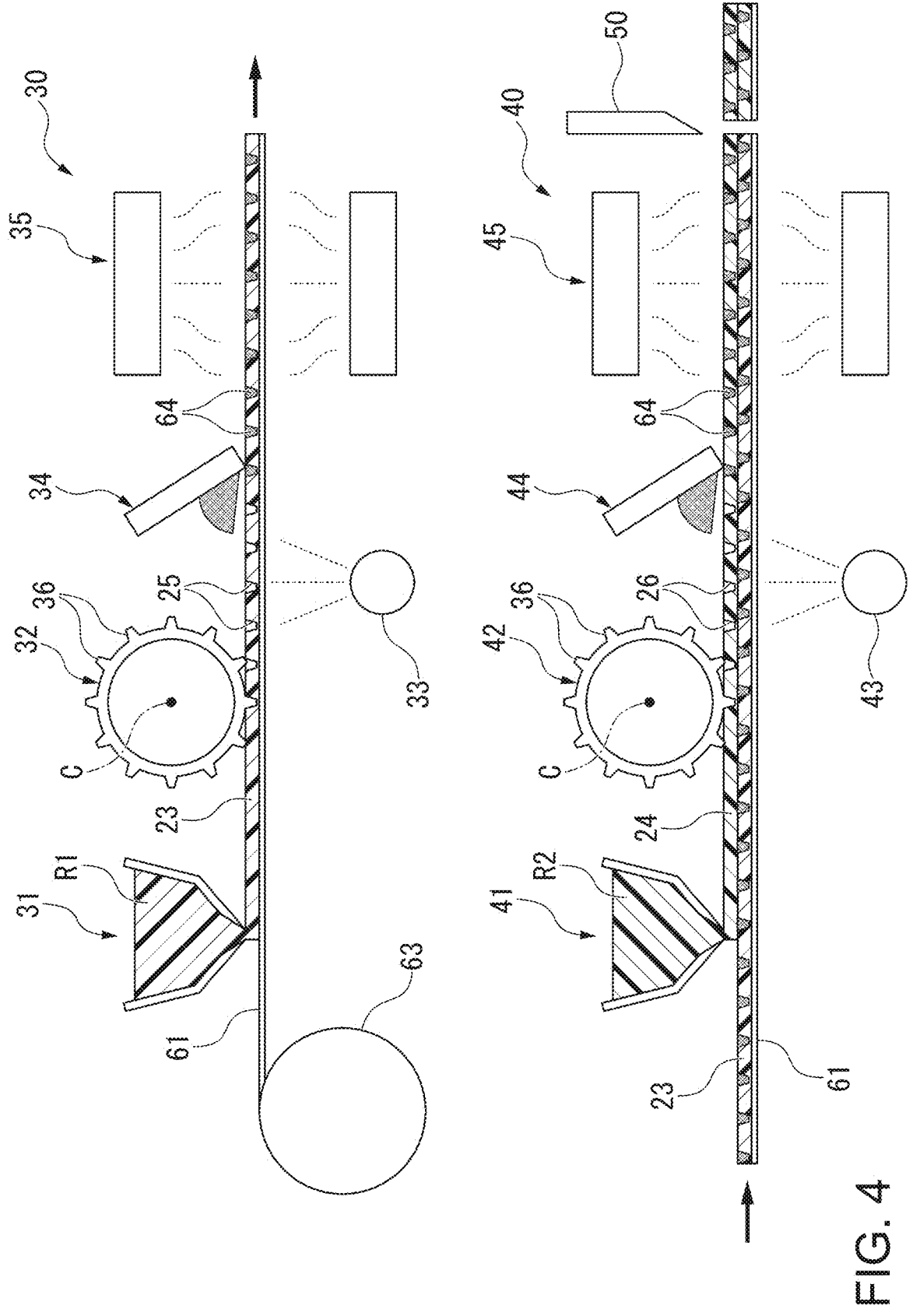
FIG. 4 illustrates the structure of a manufacturing apparatus for the display device according to one or more embodiments.

FIG. 4 illustrates the structure of a manufacturing apparatus of the display device of one or more embodiments. FIGS. 5 to 12 illustrate manufacturing steps for the display device of one or more embodiments. The manufacturing method for the display device of one or more embodiments includes the step of forming the touch function layer 5.

<Step of Forming Touch Function Layer>

FIG. 4 illustrates an apparatus for forming the touch function layer 5. As illustrated in FIG. 4, this apparatus includes a first layer forming section 30, a second layer forming section 40, and a cutter 50. The first layer forming section 30 includes a first resin supply 31, a first recess forming tool 32, a first UV irradiator 33, a first conductive material supply 34, and a first heating furnace 35.

The second layer forming section 40 includes a second resin supply 41, a second recess forming tool 42, a second UV irradiator 43, a second conductive material supply 44, and a second heating furnace 45. The first recess forming tool 32 and second recess forming tool 42 may be collectively called a recess forming tool 32, 42.

The first resin supply 31 supplies resin R1 that is a material of the first insulating layer 23. The second resin supply 41 supplies resin R2 that is a material of the second insulating layer 24. Curable resin may be used for resins R1 and R2 that are materials of the first insulating layer 23 and the second insulating layer 24, respectively. Examples of the curable resin include a UV curable resin and a thermoplastic resin.

The first recess forming tool 32 and the second recess forming tool 42 are cylindrical (or columnar) with the central axis C orthogonal to the travel direction of a base 61. The recess forming tool 32, 42 is a recess forming roller that is rotatable around the central axis C.

The recess forming tool 32, 42 has an outer peripheral surface with a plurality of protruding portions 36 protruding radially outward. These protruding portions 36 are each formed at a different position around the axis of the recess forming tool 32, 42. For example, these protruding portions 36 are formed at intervals around the axis of the recess forming tool 32, 42.

These protruding portions 36 may have a cross-sectional shape (the shape of a cross section orthogonal to the central axis C) that is rectangular or is trapezoidal with a width that gradually narrows in the protruding direction. The shape of the protruding portions 36 may be determined in accordance with the shapes of the recessed portions 25, 26 to be formed. The protruding portions 36 may be ridges (linear protrusions) extending in a direction corresponding to the recessed portions 25, 26 to be formed.

The first UV irradiator 33 cures the first insulating layer 23 by UV irradiation. The second UV irradiator 43 cures the second insulating layer 24 by UV irradiation.

The first conductive material supply 34 and second conductive material supply 44 supply the electrically conductive material 64. Examples of the electrically conductive material 64 include electrically conductive paste. Examples of the electrically conductive paste include metal paste containing particles made of metals such as silver, copper, and aluminum.

The first heating furnace 35 and the second heating furnace 45 heat and cure the electrically conductive material 64 by irradiating it with infrared rays, for example.

The step of forming the touch function layer 5 will be described in detail. The step of forming the touch function layer 5 includes the following first to sixth sub-steps.

(First Sub-Step: Formation of First Insulating Layer and First Electrode)

Figures 5, 6, 7, 8, 9:
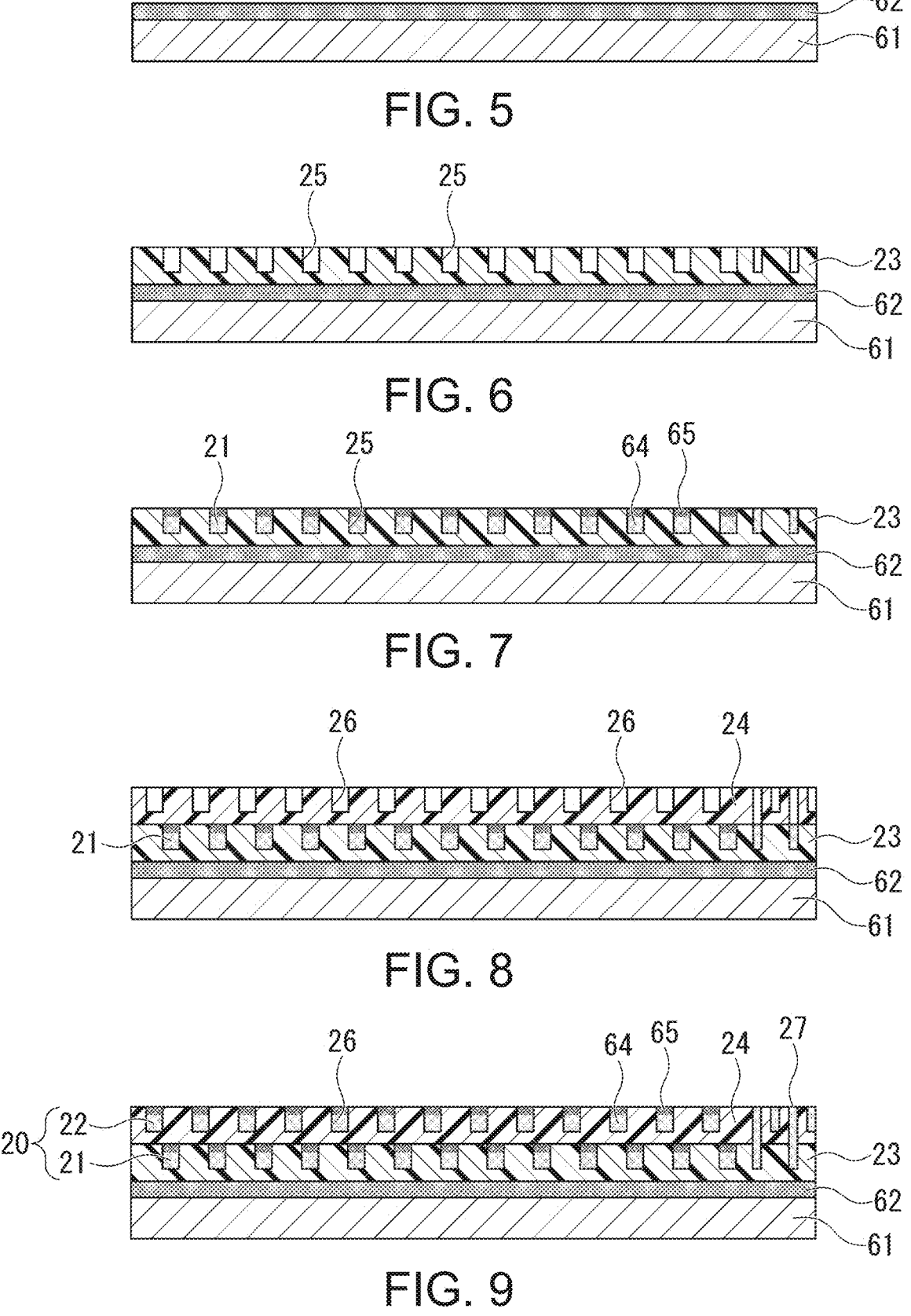
FIG. 5 illustrates a step in the method for manufacturing a display device according to one or more embodiments.
FIG. 6 illustrates a step in the method for manufacturing a display device according to one or more embodiments.
FIG. 7 illustrates a step in the method for manufacturing a display device according to one or more embodiments.
FIG. 8 illustrates a step in the method for manufacturing a display device according to one or more embodiments.
FIG. 9 illustrates a step in the method for manufacturing a display device according to one or more embodiments.

As illustrated in FIGS. 4 and 5, a sheet-like base 61 made of polyethylene terephthalate (PET), for example, is prepared. As illustrated in FIG. 5, UV ink 62 may be applied to the upper surface of the base 61 in advance. The base 61 and UV ink 62 are UV (ultraviolet) transmissive.

As illustrated in FIG. 4, the base 61 is pulled out from the roller 63. While pulling the base 61, the UV-curable resin R1 is applied to the upper surface of the base 61 using the first resin supply 31. This forms the first insulating layer 23 on the upper surface of the base 61.

While rotating the first recess forming tool 32 around its axis in accordance with the speed at which the base 61 is pulled out, the plurality of protruding portions 36 are pressed against the uncured first insulating layer 23. This forms a plurality of first recessed portions 25 on the upper surface of the first insulating layer 23 (see FIG. 6).

Using the first UV irradiator 33, the first insulating layer 23 is irradiated with UV light through the base 61, thereby curing the first insulating layer 23.

The first conductive material supply 34 is used to fill the first recessed portions 25 with the electrically conductive material 64 (e.g., electrically conductive paste). A protective layer 65 may be formed on the surface of the electrically conductive material 64 in the first recessed portions 25 (see FIG. 7).

The base 61 on which the first insulating layer 23 has been formed is introduced into the first heating furnace 35, and the electrically conductive material 64 is heated and cured by infrared radiation, for example. This forms first electrodes 21 made of the electrically conductive material 64 in the first recessed portions 25 (see FIG. 7).

(Second Sub-Step: Formation of Second Insulating Layer and Second Electrode)

The UV-curable resin R2 is applied to the upper surface of the first insulating layer 23 using the second resin supply 41. This forms the second insulating layer 24 on the upper surface of the first insulating layer 23.

While rotating the second recess forming tool 42 around its axis in accordance with the speed at which the base 61 is pulled out, the plurality of protruding portions 36 are pressed against the uncured second insulating layer 24. This forms a plurality of second recessed portions 26 on the upper surface of the second insulating layer 24 (see FIG. 8).

Using the second UV irradiator 43, the second insulating layer 24 is irradiated with UV light through the base 61 and the first insulating layer 23, thereby curing the second insulating layer 24.

The second conductive material supply 44 is used to fill the second recessed portions 26 with the electrically conductive material 64. A protective layer 65 may be formed on the surface of the electrically conductive material 64 in the second recessed portions 26 (see FIG. 9).

In the second heating furnace 45, the electrically conductive material 64 is heated and cured by infrared radiation, for example. This forms second electrodes 22 made of the electrically conductive material 64 in the second recessed portions 26 (see FIG. 9).

(Third Sub-Step: Cutting)

Using the cutter 50, the insulating layers 23 and 24 and the base 61 are cut to a predetermined length.

(Fourth Sub-Step: Connection with Flexible Printed Circuit Board)

Figure 10:
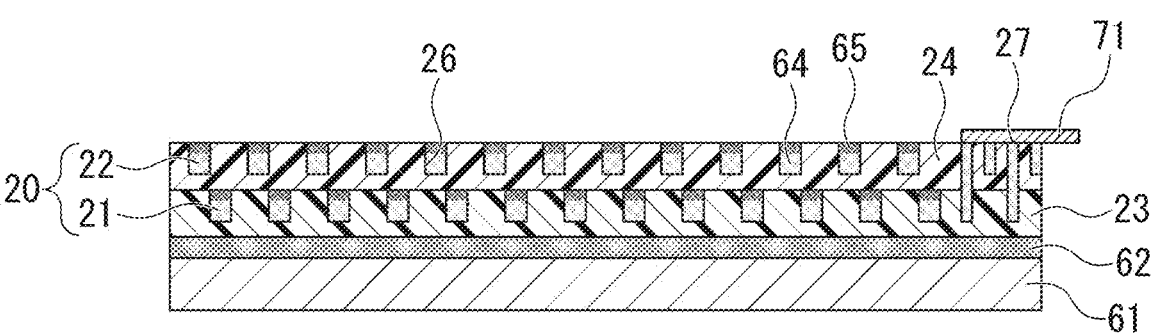
FIG. 10 illustrates a step in the method for manufacturing a display device according to one or more embodiments.

As illustrated in FIG. 10, an end of the flexible printed circuit board 71 is connected to the terminal 27 of the second insulating layer 24. This electrically connects the first and second electrodes 21 and 22 with a control board (not illustrated) via the flexible printed circuit board 71.

(Fifth Sub-Step: Attachment of First Polarizer)

Figure 11:
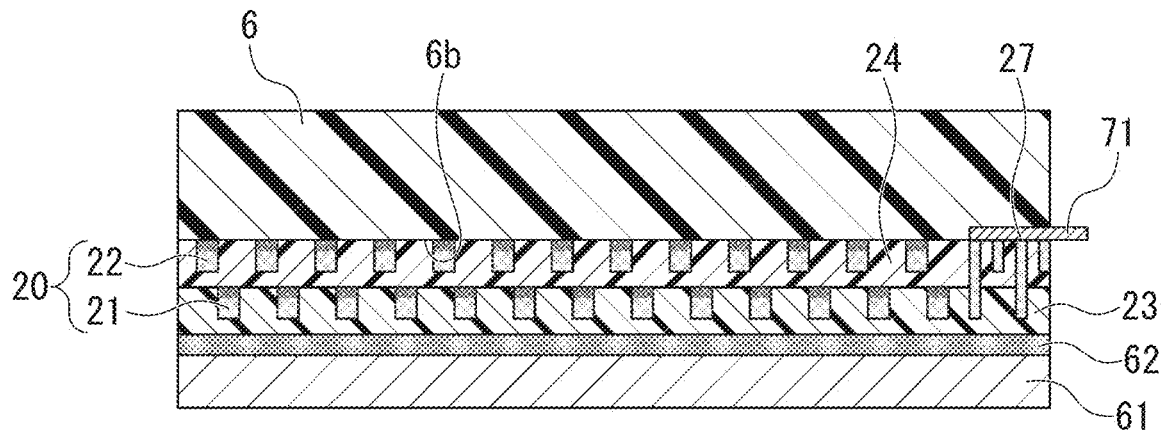
FIG. 11 illustrates a step in the method for manufacturing a display device according to one or more embodiments.

As illustrated in FIG. 11, the first polarizer 6 is superimposed on the upper surface 24a of the second insulating layer 24. The lower surface 6b of the first polarizer 6 may be placed directly on the upper surface 24a of the second insulating layer 24, or may be placed indirectly in contact with the upper surface 24a via a bonding layer (or an adhesive layer). This forms the touch function layer 5 on the lower surface 6b of the first polarizer 6.

(Sixth Sub-Step: Removal of Base 61)

As illustrated in FIG. 12, the base 61 is peeled off from the touch function layer 5 (specifically, from the first insulating layer 23). This results in the first polarizer 6 with the touch function layer 5 on the lower surface 6b.

<Step of Assembling Other Components>

As illustrated in FIG. 2, the first polarizer 6 with the touch function layer 5 formed thereon is combined with the cover 7, optical bonding layer 4, liquid crystal cell 3, second polarizer 2, and backlight unit 1 to manufacture the display device 103.

[Advantageous Effects from the Display Device and its Manufacturing Method According to One or More Embodiments]

The display device 103 of one or more embodiments has the touch function layer 5 formed on the lower surface 6b (first main surface) of the first polarizer 6. This reduces the overall thickness compared to the configuration having a touch function layer formed on a component (e.g., color filter substrate) of the LCD cell. This leads to a thinner display unit 103. A thinner display device 103 makes the electronic apparatus 100 also thinner.

In contrast, an on-cell type display device having a touch function layer formed on a color filter substrate needs the color filter substrate with a sufficient thickness because slimming processing is performed to the color filter substrate. This makes it difficult to have a thinner display device.

The display unit 103 may include most components that are common to existing display devices, except for the first polarizer 6 and touch function layer 5. This allows existing components to be used. This is advantageous in terms of manufacturing costs and ease of manufacturing.

In contrast, on-cell type or in-cell type display devices have many dedicated components, which makes them disadvantageous in terms of manufacturing costs and ease of manufacturing.

When manufacturing both a display device with a touch function and a display device without a touch function, the display device 103 have many common components between these two types of display devices, thus reducing manufacturing costs.

The display device 103 can be made thinner, which makes a difference in thickness between the two types of display devices with a touch function and without a touch function when both types are to be manufactured. This allows the first chassis (display chassis) accommodating the display device to be used for both types. This reduces the manufacturing costs.

The touch function layer 5 in the display device 103 has the first electrodes 21 and the second electrodes 22 that form a multilayer structure. This makes the touch function layer 5 thinner. This therefore makes the display device 103 thinner.

The method for manufacturing the display device 103 of one or more embodiments presses the protruding portions 36 of the recess forming tools 32, 42 against the insulating layers 23, 24 to form the recessed portions 25, 26, and filling the recessed portions 25, 26 with the electrically conductive material 64 to form the electrodes 21, 22. This manufacturing method reduces the costs of manufacturing the first polarizer 6 with the touch function layer 5 compared to a method that forms recessed portions in an insulating layer by etching or the like. This reduces the manufacturing costs of the display device 103.

The manufacturing apparatus illustrated in FIG. 4 includes a general-purpose apparatus except for the recess forming tools 32 and 42. Therefore, this manufacturing method produces the first polarizer 6 with touch function layer 5 at low cost. This manufacturing method is easily applicable to manufacture display devices with different specifications.

This manufacturing method forms the touch function layer 5 on the lower surface 6b (first main surface) of the first polarizer 6. This makes the display device 103 thinner compared to the method of forming a touch function layer on a component (e.g., color filter substrate) of the LCD cell.

This manufacturing method includes most steps that are common to existing methods for manufacturing a display device, except for the step of forming the touch function layer 5. This allows existing manufacturing lines to be used. This is advantageous in terms of manufacturing costs and ease of manufacturing.

This manufacturing method uses the recess forming tools 32, 42, which allows the first recessed portions 25 to be formed in the first insulating layer 23, the second insulating layer 24 to be formed on the first insulating layer 23, and the second recessed portions 26 to be formed in the second insulating layer 24. This method allows a plurality of recessed insulating layers 23, 24 to be stacked on one surface of the base 61. The method therefore manufactures the insulating layers 23 and 24 having a multilayer structure easily compared to a method in which a plurality of insulating layers with recesses are formed on different bases.

The specific configuration of the present invention is not limited to the above-described embodiments, and also includes designs or the like within the scope of the present invention. The configurations described in the above embodiments can be combined freely.

The shape of the protruding portions 36 of the recess forming tools 32, 42 illustrated in FIG. 4 (the shape of a cross section orthogonal to the central axis C) is not particularly limited, and may be a wedge shape, a semicircular shape, or others.

The display device 103 of one or more embodiments includes the touch function layer 5 of a mutual capacitance type, and a self-capacitance type may be used to detect a touch input.

Instead of the laptop PC, the electronic apparatus may be of other types, such as a tablet terminal, a smartphone, and a desktop PC.

DESCRIPTION OF SYMBOLS

2 second polarizer
3 liquid crystal cell
5 touch function layer
6 first polarizer
6b lower surface (first main surface)
20 electrode
21 first electrode
22 second electrode
100 electronic apparatus
What is claimed is:

1. A display device having a rear surface, comprising:
a first polarizer having a first main surface;
a second polarizer disposed closer to the rear surface than the first polarizer, the second polarizer to be opposed to the first main surface of the first polarizer;
a liquid crystal cell between the first polarizer and the second polarizer; and
a touch function layer between the first polarizer and the liquid crystal cell,
the touch function layer having an electrode that detects a touch input, the touch function layer being disposed on the first main surface of the first polarizer, wherein
the electrode includes:
a first insulating layer with an upper surface that includes first recessed portions;
first electrodes embedded in the first recessed portions;
a first protective layer of ink disposed on an upper surface of the first electrodes; and
a second insulating layer disposed on the upper surface of the first insulating layer, where the second insulating layer separates the first electrodes from second electrodes in a thickness direction of the display device.

2. The display device according to claim 1, wherein
the first electrodes extend in a first direction along the first main surface; and
the second electrodes extend in a second direction along the first main surface,
the second direction intersecting the first direction, and
the first electrode and the second electrode have a multilayer structure.

3. An electronic apparatus comprising the display device according to claim 1.

4. A method for manufacturing a display device having a rear surface and including: a first polarizer having a first main surface; a second polarizer disposed closer to the rear surface than the first polarizer, the second polarizer to be opposed to the first main surface of the first polarizer; a liquid crystal cell between the first polarizer and the second polarizer; and a touch function layer between the first polarizer and the liquid crystal cell, the touch function layer having an electrode that detects a touch input, the method including:
rotating a recess forming tool about a central axis to press a plurality of protruding portions on a surface of the recess forming tool into an upper surface of a first insulating layer to form first recessed portions in the upper surface of the first insulating layer;
partially filling the first recessed portions with an electrically conductive material to form first electrodes of the electrode;
applying a first protective layer of ink on an upper surface of the first electrodes;
applying a second insulating layer to the upper surface of the first insulating layer; and
forming second electrodes in the second insulating layer such that the second insulating layer separates the first electrodes from second electrodes in a thickness direction of the display device.

5. The display device according to claim 1, wherein
the second insulating layer has with an upper surface that includes second recessed portions;
the second electrodes are embedded in the second recessed portions; and
a second protective layer of ink is disposed on an upper surface of the second electrodes.

* * * * *